(No Model.)
I. J. KUBATZ.
DEVICE FOR DETACHING ANIMALS.
No. 400,092. Patented Mar. 26, 1889.
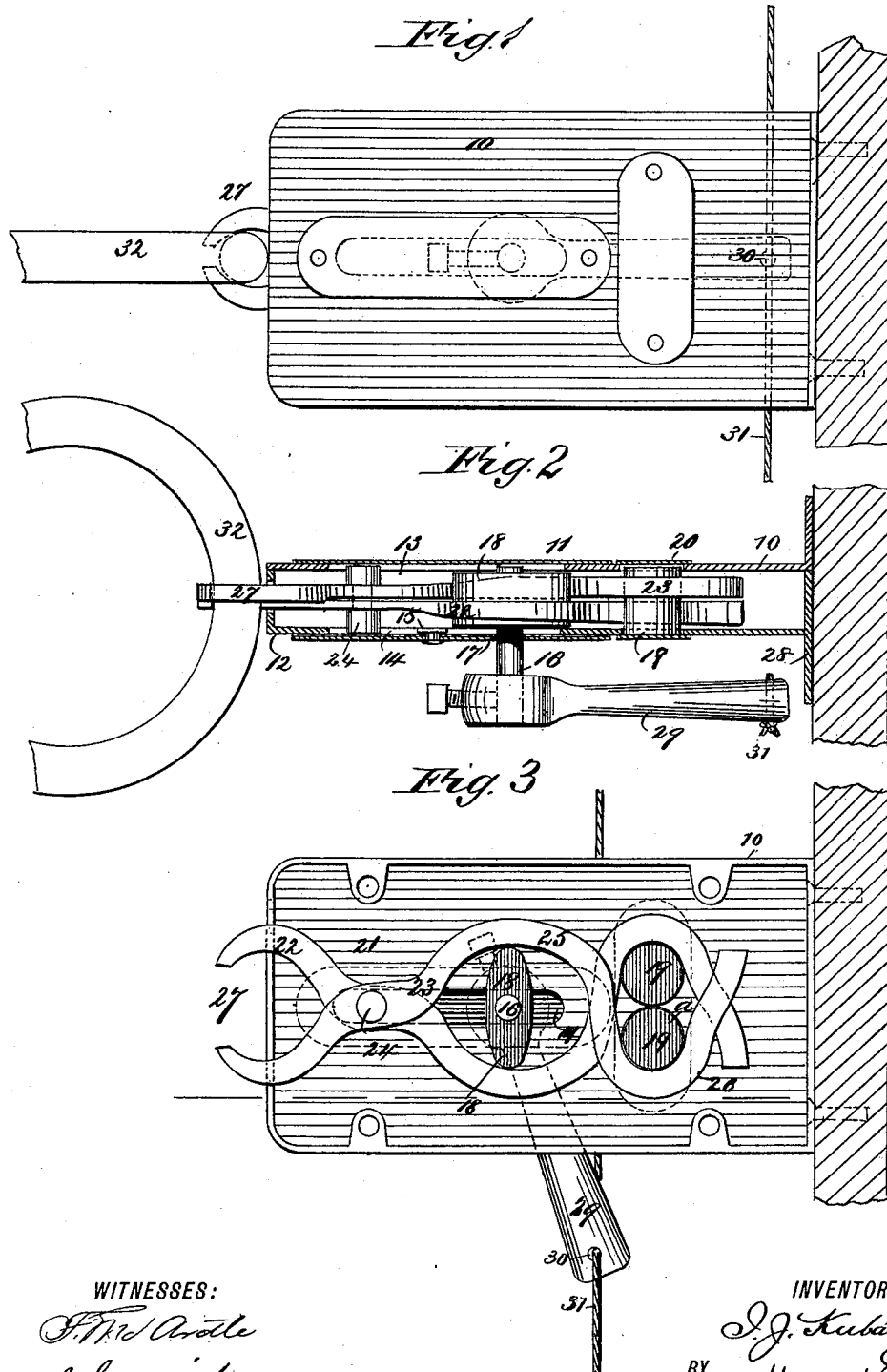
WITNESSES:
INVENTOR:
BY
ATTORNEYS.

UNITED STATES PATENT OFFICE.

IGNATZ J. KUBATZ, OF NEW YORK, N. Y.

DEVICE FOR DETACHING ANIMALS.

SPECIFICATION forming part of Letters Patent No. 400,092, dated March 26, 1889.

Application filed November 8, 1888. Serial No. 290,269. (No model.)

*To all whom it may concern:*

Be it known that I, IGNATZ J. KUBATZ, of the city, county, and State of New York, have invented new and Improved Devices for Detaching Animals, of which the following is a full, clear, and exact description.

My invention relates to an improvement in devices for detaching or releasing animals from the stalls, and has for its object to provide a means whereby an animal or a number of animals may be released from attachment to the stall in the event of fire in a simple and expeditious manner without the necessity of the operator entering the several stalls or even the building.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the device, illustrating the fingers as closed at their outer extremities. Fig. 2 is a longitudinal vertical section, the fingers being in the same position shown in Fig. 1; and Fig. 3 is a plan view of the device with the top plate removed, illustrating the position of the fingers when opened to release the animal.

In carrying out the invention the body of the device consists of a casing, 10, preferably rectangular in contour, and provided with closed ends and sides, and likewise with a closed top and bottom. In the top and bottom plates, 11 and 12, of the casing vertically-aligning longitudinal slots 13 and 14 are respectively produced, the said slots being preferably covered by a cap-plate. The cap-plate of the lower section is held to slide longitudinally of the casing, and to that end is provided with a guide projection, 15, as best illustrated in Fig. 2, which projection is adapted for frictional contact with the walls of the lower slot, 14. A pintle, 16, is passed upward through a suitable aperture in the said sliding plate 17, as best illustrated in Fig. 2, the upper end of said pintle being adapted to travel in the upper slot, 13, of the casing. Between the top and bottom plates of the casing an elliptical cam, 18, is rigidly fastened to the pintle 16, or cast integrally therewith, the said pintle being adapted to move with the plate 17. Two stops, 19 and 19ª, are arranged side by side near the rear end of the casing and to the rear of the lower casing-slot, 14, the said stops being preferably so located that a line drawn between the two longitudinally of the lower plate would pass over the center of the lower slot, 14, of the casing. The stops 19 and 19ª are held in position between the top and bottom plates of the casing by having their extremities entered in suitable recesses, 20, formed in the said top and bottom casing-plate, as is best illustrated in Fig. 2.

The gripping-fingers 21, employed in connection with the casing, consist of two members, 22 and 23, pivoted near the outer end by a pin, 24, which pin is purposed to travel in the upper and lower casing-slots, 13 and 14. The said members of the gripping-fingers 21 are so bent upon themselves as to form combinedly a central circular section, 25, surrounding the cam 18, as best shown in Fig. 3, and a similar rear section, 26, the forward ends of the said members of the gripping-fingers being bent in opposite directions to form the hook 27. It will be observed that as the members 22 and 23 of the gripping-fingers are pivoted at but one point—namely, between the hook-section 27 and the intermediate section, 25—the said members are free to move one upon the other to close or open the hook-section 27. A flange, 28, is made to project above and below the casing 10 at the inner end, as best shown in Fig. 2, whereby the device is attached, through the medium of screws or other similar means, to the front of the stall or any suitable support within the same or adjacent thereto. A lever, 29, is secured to the lower end of the pintle 16, and the said lever is preferably provided with an aperture, 30, near its free end.

In operation, when the devices have been attached to the several stalls of a barn or stable, a rope, chain, or wire, 31, is made to pass through the apertures of the several levers 29 and to any desired point outside of the said barn or stable; or the rope, chain, or wire may be made to terminate within the stable, if found desirable. The normal position of the lever 29 is parallel with the axis of the plate of the casing 10, as illustrated in Fig. 2, whereupon the cam 18 is parallel with the lever, and the central section, 25, of the gripping-fingers is reduced to its minimum and brought in contact with the sides of the cam. When such is the case, the hooked extremity of the gripping-fingers is closed and made to retain within its grasp a suitable hitching-ring, 32. The normal position of the device is illustrated in Figs. 1 and 2.

When, from any cause, it becomes desirable to release the animals in the several stalls, the rope 31 is pulled from the outside of the barn, whereupon the levers 29 are brought at a right angle to the axis of the casing and the cam 18 transversely of the same. When the cam is brought to this position, it forces apart the members of the gripping-fingers at the central section, 25, thereby opening the hook-section 27 and permitting the ring 32 to drop therefrom. The limit of this outward movement of the fingers is controlled by the stops 19 and 19ª, as illustrated in Fig. 3.

To attach the animals again to the device they are led into the several stalls, the ring is inserted between the members of the gripping-fingers at the hook end, and the lever swung back to its normal position, whereupon the lever will strike the lower flange, 28, and cause the pintle 16 to travel forward in the slots 13 and 14, and the hooked end of the gripping-fingers is carried outward through a suitable aperture in the forward end of the casing and at the same time closed over the ring.

Having thus described my invention, I claim as new and desire to secure by Letters Patent—

1. The combination, with a casing provided with vertically-aligning top and bottom slots, a lower sliding plate, a pintle projecting upward through the plate and carrying an essentially-elliptical cam, and a lever secured to the lower end of the said pintle, of pivoted gripping-fingers bent upon themselves to form a central circular section inclosing the cam, and an outer hooked section, all combined for operation substantially as shown and described.

2. The combination, with a casing provided with vertically-aligning top and bottom slots, a lower sliding plate, a pintle projecting upward through the plate and carrying an essentially-elliptical cam, and a lever secured to the lower end of said pintle, of stops secured between the upper and lower walls of the casing to the rear of the said slots, pivoted gripping-fingers held to slide within the slots of the casing and bent upon themselves to form a central circular section inclosing the cam, a rear circular section inclosing the stops, and an outer hooked section, all combined for operation substantially as shown and described.

IGNATZ J. KUBATZ.

Witnesses:
J. F. ACKER, Jr.,
EDGAR TATE.